United States Patent [19]

Tsuchiya et al.

[11] 3,912,468
[45] Oct. 14, 1975

[54] AIR BUBBLE SEPARATING DEVICE

[75] Inventors: Takao Tsuchiya; Kazuyoshi Fukatsu, both of Kariya; Toshio Hirokawa, Okazaki, all of Japan

[73] Assignee: Toyoda Koki Kabushiki Kaisha, Japan

[22] Filed: Oct. 8, 1974

[21] Appl. No.: 513,156

[30] Foreign Application Priority Data
Oct. 10, 1973 Japan............................ 48-113379

[52] U.S. Cl. ................................ 55/159; 55/203
[51] Int. Cl.² .......................................... B01D 19/00
[58] Field of Search .............. 55/36, 41, 43, 52, 55, 55/191, 199, 203, 204; 210/304, 512

[56] References Cited
UNITED STATES PATENTS

| | | | |
|---|---|---|---|
| 2,786,546 | 3/1957 | McMillin ............................ | 55/203 |
| 3,273,313 | 9/1966 | Livesey et al. ...................... | 55/55 X |
| 3,303,895 | 2/1967 | Fontenot............................ | 55/191 X |
| 3,581,464 | 6/1971 | Bhuta et al. ........................ | 55/43 |
| 3,608,272 | 9/1971 | Peri et al. ........................... | 55/43 X |
| 3,803,810 | 4/1974 | Rosenberg............................ | 55/159 |

Primary Examiner—Samih N. Zaharna
Assistant Examiner—Richard W. Burks
Attorney, Agent, or Firm—Oblon, Fisher, Spivak, McClelland & Maier

[57] ABSTRACT

An air bubble separating device includes a reservoir provided with an inlet and an outlet. A control plate is provided in the reservoir in such a position relative to the inlet as to generate a vortex flow of the liquid delivered from the inlet. A stability plate, mounted above the inlet for stabilizing the vortex flow, has a hole at the central portion thereof for passing therethrough air bubbles mixed in the liquid. A restricting member is mounted below the inlet for permitting the passage of the liquid to the outlet while restricting the passage of air bubbles therethrough.

3 Claims, 2 Drawing Figures

AIR BUBBLE SEPARATING DEVICE

BACKGROUND OF THE INVENTION

1. Field of the Invention

The present invention relates to an air bubble separating device for separating air bubbles mixed in a liquid.

2. Description of the Prior Art

In general, air bubbles are sometimes mixed within a liquid as a result of air suction created by a pump, failure of complete sealing of a reservoir and pump system or by air suction created by the surface of the liquid when the liquid is lowered within the reservoir. Conventional hydraulic systems have generally not been provided with an air bubble separating device and in general the liquid in such systems has contained air bubbles which are supplied to a hydraulically operated device through a pump from a reservoir. Since the liquid containing air bubbles increases the compressibility thereof, such conventional hydraulic systems have suffered from difficulties. Such prior art hydraulically operated devices have been irregularly operated and have produced noises such that the efficiency thereof has been lower.

SUMMARY OF THE INVENTION

It is therefore an object of the present invention to provide a new and improved air bubble separating device to effectively separate air bubbles mixed in a liquid.

It is a further object of the present invention to provide a new and improved air bubble separating device to effectively separate air bubbles mixed in a liquid by providing a control plate in a reservoir to generate a vortex flow of the liquid returned from a hydraulically operated device.

BRIEF DESCRIPTION OF THE DRAWINGS

The foregoing and other objects of the present invention will be more fully appreciated as the same becomes better understood from the following detailed description of the preferred embodiment, when considered in connection with the accompanying drawings, in which.

DETAILED DESCRIPTION OF THE PREFERRED EMBODIMENT

Figure 1:
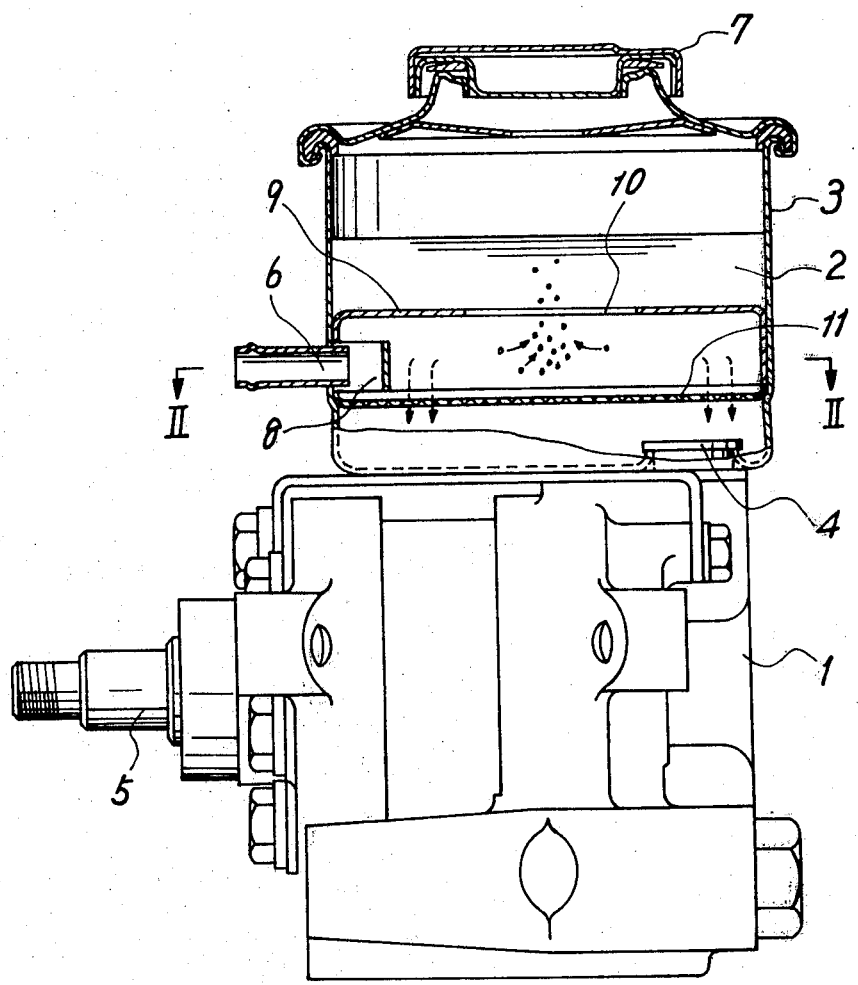
FIG. 1 is a front view, partly in section, of a pump device having an air bubble separating device according to the present invention.
Figure 2:
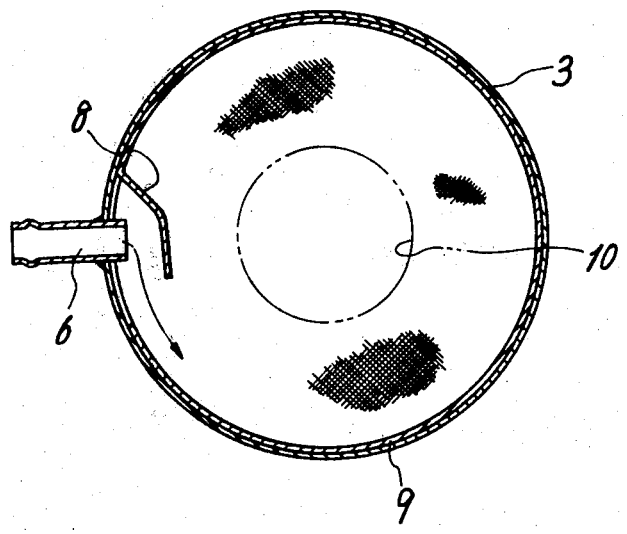
FIG. 2 is a sectional view taken along the line II—II of FIG. 1.

Referring now to the drawings, wherein like reference characters refer to identical or corresponding parts throughout the several views, and more particularly to FIG. 1 whereon there is shown a pump 1 on which a cylindrical reservoir 3, having a bottom portion to accommodate a liquid 2, is fixedly mounted. An outlet 4 is provided in the reservoir 3 to supply the liquid to the pump 1. The liquid 2 in the reservoir is drawn out by the pump 1 through the outlet 4 by rotation of a pump shaft 5. The liquid is then delivered to a hydraulically operated device, not shown, from a delivery port of the pump, not shown. The reservoir 3 is provided with an inlet 6 through which the liquid is returned from the hydraulically operated device. Reference numeral 7 designates a lid for the reservoir. A stability plate 9, in cylindrical form, is guided and supported by the inside of the side wall of the reservoir 3. A portion of the side wall of the stability plate 9 is bent inwardly to form a control plate 8 such that fluid entering the inlet 6 will be guided by the control plate. The end of the control plate 8 is projected along the side wall of the reservoir 3, as shown in FIG. 2, in such a manner that the liquid entering the inlet 6 is guided by the control plate 8, whereby a vortex flow of the liquid is generated. Therefore, as a result of the vortex flow, a pressurized fluid containing few air bubbles is forced to flow to the outer periphery of the reservoir 3 while the air bubbles are gathered toward the central portion of the reservoir 3 from which they come to the surface of the liquid 2. The upper wall of the stability plate 9 is located above the control plate 8 such that the liquid striking against the control plate 8 cannot move in an upward direction. Furthermore the plate 9 stabilizes the vortex flow. The upper wall of the stability plate 9 is provided at the central portion thereof with a hole 10 such that the air bubbles can pass therethrough to the upper surface of the liquid. A circular restricting member 11, such as a wire-netting, is guided and supported below the control plate 8 by the side wall of the reservoir 3. The restricting member 11 is provided to effectively separate the air bubbles from the liquid by utilizing the pressure difference between the central portion and the peripheral portion of the vortex flow. High pressure fluid at the outer periphery of the reservoir 3 passes through the restricting member 11, as indicated by the arrows in FIG. 1. However, air bubbles at the central portion of the reservoir cannot pass through the restricting member 11 and, therefore, come to the surface of the liquid 2, such that air bubbles are precluded from being sucked in the outlet 6. The restricting member 11 also serves as a filter to separate foreign substances in the pressurized fluid.

As described above, according to the present invention, when the liquid is returned to the reservoir, since the control plate is provided in opposite relation with the inlet so as to produce the vortex flow, air bubbles mixed in the liquid are effectively separated by a centrifugal force caused by the vortex flow, to thereby supply the liquid without air bubbles to the hydraulically operated device.

Moreover, the stability plate having a hole at the central portion thereof is provided above the control plate to avoid upward spattering of the liquid which strikes against the control plate, such that stable vortex flow is produced in the reservoir to create an effective separation of the air bubbles. The restricting member, permitting passage of the liquid but restricting passage of the air bubbles, is provided below the control plate such that mixture of air bubbles into the lower portion of the liquid is avoided to thereby positively separate the air bubbles.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An air bubble separating device comprising:
a reservoir for accommodating a liquid;

an inlet provided in the reservoir for receiving the liquid;

an outlet provided in the reservoir for supplying the liquid;

a control plate provided in a position relative to said inlet such that fluid from said inlet strikes said control plate, the end of said control plate being extended along the side wall of said reservoir for generating a vortex flow of the liquid delivered toward said control plate from said inlet;

a stability plate mounted above said inlet for stabilizing the vortex flow and having a hole at the central portion thereof for passing therethrough air bubbles mixed in the liquid; and a restricting member mounted below said inlet for permitting the passage of the liquid but restricting the passage of air bubbles therethrough to said outlet.

2. An air bubble separating device according to claim 1, wherein said stability plate is in a cylindrical form with an upper wall located above said inlet and having said hole at the central portion thereof and the portion of the side wall of said stability plate is bent inside said reservoir to form said control plate.

3. An air bubble separating device according to claim 1, wherein said restricting member is a wire netting.

* * * * *